United States Patent [19]

Sikora

[11] Patent Number: 4,956,584
[45] Date of Patent: Sep. 11, 1990

[54] STROBE TRIGGER PULSE GENERATOR

[75] Inventor: Scott T. Sikora, Mesa, Ariz.

[73] Assignee: Tomar Electronics, Inc., Gilbert, Ariz.

[21] Appl. No.: 265,414

[22] Filed: Oct. 31, 1988

Related U.S. Application Data

[63] Continuation-in-part of Ser. No. 238,039, Aug. 29, 1988, which is a continuation of Ser. No. 42,357, Apr. 24, 1987, Pat. No. 4,775,821, which is a continuation-in-part of Ser. No. 794,415, Nov. 4, 1984, Pat. No. 4,682,081.

[51] Int. Cl.$^5$ .................... H05B 37/00; H05B 39/00; H02M 3/335; H02M 7/537
[52] U.S. Cl. .................... 315/241 R; 315/241 S; 315/DIG. 7; 363/19; 363/131
[58] Field of Search ............ 315/241 R, 241 S, 227 R, 315/219, DIG. 7; 363/18, 19, 21, 93, 131

[56] References Cited

U.S. PATENT DOCUMENTS

| | | | |
|---|---|---|---|
| 3,753,039 | 8/1973 | Bonazoli et al. | 315/241 R |
| 3,780,344 | 12/1973 | Paget | 315/241 R |
| 4,013,921 | 2/1977 | Corthell | 315/241 |
| 4,321,507 | 3/1982 | Bosnak | 315/241 |
| 4,398,127 | 8/1983 | Bahn et al. | 315/241 P |
| 4,755,723 | 7/1988 | Sikora | 315/219 |

OTHER PUBLICATIONS

The Exhibit A Tomar Microstrobe circuit, dated prior to 10-31-1988.

Primary Examiner—Eugene R. LaRoche
Assistant Examiner—Michael B. Shingleton
Attorney, Agent, or Firm—Cahill, Sutton & Thomas

[57] ABSTRACT

A strobe trigger pulse generator includes a power supply, an energy storage capacitor coupled to the power supply and a trigger pulse generator which intermittently energizes a trigger pulse transformer to ionize the gaseous interior of a strobe flash lamp. The trigger pulse generator includes a trigger capacitor coupled to the trigger pulse transformer. A trigger capacitor charging device is coupled between the power supply and the trigger capacitor to selectively direct a charging current to the trigger capacitor. The trigger capacitor discharge circuit is coupled to the trigger capacitor to periodically discharge the capacitor through the trigger pulse transformer to generate a high voltage trigger pulse. A charge path disabling circuit is coupled to the current flow path between the power supply and the trigger capacitor to control the charging current directed to the trigger capacitor.

39 Claims, 6 Drawing Sheets

STROBE TRIGGER PULSE GENERATOR

This application is a Continuation-in-Part application of U.S. patent application Ser. No. 238,039 filed on Aug. 29, 1988, which is a Continuation application of U.S. patent application Ser. No. 042,357 filed on Apr. 24, 1987, now U.S. Pat. No. 4,775,821, which is a Continuation-in-Part application of U.S. patent application Ser. No. 794,415 filed on Nov. 4, 1984, now U.S. Pat. No. 4,682,081.

BACKGROUND OF THE INVENTION

1. Field of the Invention

This invention relates strobe power supplies for intermittently energizing a gaseous discharge tube, and more particularly, to the trigger pulse generator circuit of such strobe power supplies

2. Description of the Prior Art

Trigger pulse generators for prior art strobe lighting systems typically generate individual, spaced apart trigger pulses which result in the generation of a single periodic optical output of a strobe flash bulb. Another form of prior art strobe lighting device includes a trigger pulse generator which generates closely spaced, paired trigger pulses what some manufacturers refer to as a double flash output.

U.S. Pat. No. 4,013,921 (Corthell) discloses a strobe power supply having a trigger pulse generator Which generates closely spaced, paired trigger output pulses for generating a double flash output. The Corthell circuit utilizes an integrated circuit square wave generator 26, the output of which is transmitted through a capacitor differentiator to produce a pulse in response to both the leading and trailing edges of each square Wave output pulse. The first or positive going differentiator pulse is coupled to the gate of one SCR which generates a trigger pulse while the second or negative going differentiator pulse is coupled to the gate of a second SCR which generates a trigger pulse synchronized With the trailing edge of each square wave output pulse. The Corthell trigger circuit is unable to generate anything but closely spaced, paired trigger output pulses.

U.S. Pat. No. 4,321,507 (Bosnak) discloses another double flash strobe power supply circuit which includes an integrated circuit square wave timer. The square wave output of the timer is transmitted through a capacitive differentiator which generates a positive going pulse at the leading edge of each square wave and a negative going pulse at the trailing edge of each square wave. Closely spaced, paired positive and negative going pulses from the capacitive differentiator are coupled to the gate of a triac which generates closely spaced, paired trigger pulses synchronized with the leading and trailing edges of each square wave generated by the timer circuit. The Bosnak circuit is thus able to generate a double flash output Where each strobe lamp output flash is synchronized with the leading and trailing edges of each square wave generated by the trigger pulse generator timing device.

In another prior art device identified as the Tomar MICROSTROBE, the trigger pulse generator takes the form of a sidac-actuated relaxation oscillator including a series connected resistor and capacitor where the capacitor also serves as the trigger capacitor. A voltage controlled switch in the form of a sidac periodically assumes a short circuit condition When the trigger capacitor voltage reaches the sidac breakover voltage and generates a trigger pulse. With this prior art trigger pulse generator circuit, the frequency of the single flash output pulses is fixed.

SUMMARY OF THE INVENTION

It is therefore a primary object of the present invention to provide a strobe trigger pulse generator which is capable of generating trigger pulses in pulse trains Which are spaced apart by a controllable time interval and Which include a controllable number between one to many trigger pulses per pulse train.

Another object of the present invention is to provide a strobe trigger pulse generator which includes a free running trigger pulse generator which is alternately enabled to create a train of trigger pulses and which is then disabled to define the time interval between sequential pulse trains.

Another object of the present invention is to provide a strobe trigger pulse generator Which can be user adjusted in real time to vary the number of trigger pulses generated in each trigger pulse train, or to vary the time interval between adjacent trigger pulse trains.

Briefly stated, and in accord with one embodiment of the invention, apparatus for delivering current to an intermittently energized gaseous discharge tube comprises a power supply, an energy storage capacitor coupled to the power supply and a trigger pulse generator for intermittently energizing a trigger pulse transformer. The trigger pulse generator includes a trigger capacitor having first and second leads where the first lead is coupled to the trigger pulse transformer. The trigger pulse generator also includes trigger capacitor charging means having an input terminal coupled to the power supply and an output terminal coupled to the second lead of the trigger capacitor for establishing a current flow path between the power supply and the trigger capacitor to selectively direct a charging current to the trigger capacitor The trigger pulse generator also includes trigger capacitor discharge means coupled to the second lead of the trigger capacitor for periodically discharging the trigger capacitor through the trigger pulse transformer to generate a high voltage trigger pulse. Charge path disabling means is coupled to the current flow path between the power supply and the trigger capacitor to control the charging current directed to the trigger capacitor.

DESCRIPTION OF THE DRAWINGS

The invention is pointed out with particularity in the appended claims. However, other objects and advantages together with the operation of the invention may be better understood by reference to the following detailed description taken in connection with the following illustrations, wherein:

DESCRIPTION OF THE PREFERRED EMBODIMENT

In order to better illustrate the advantages of the invention and its contribution to the art, a preferred hardware embodiment of the invention will now be described in some detail.

Figure 1:
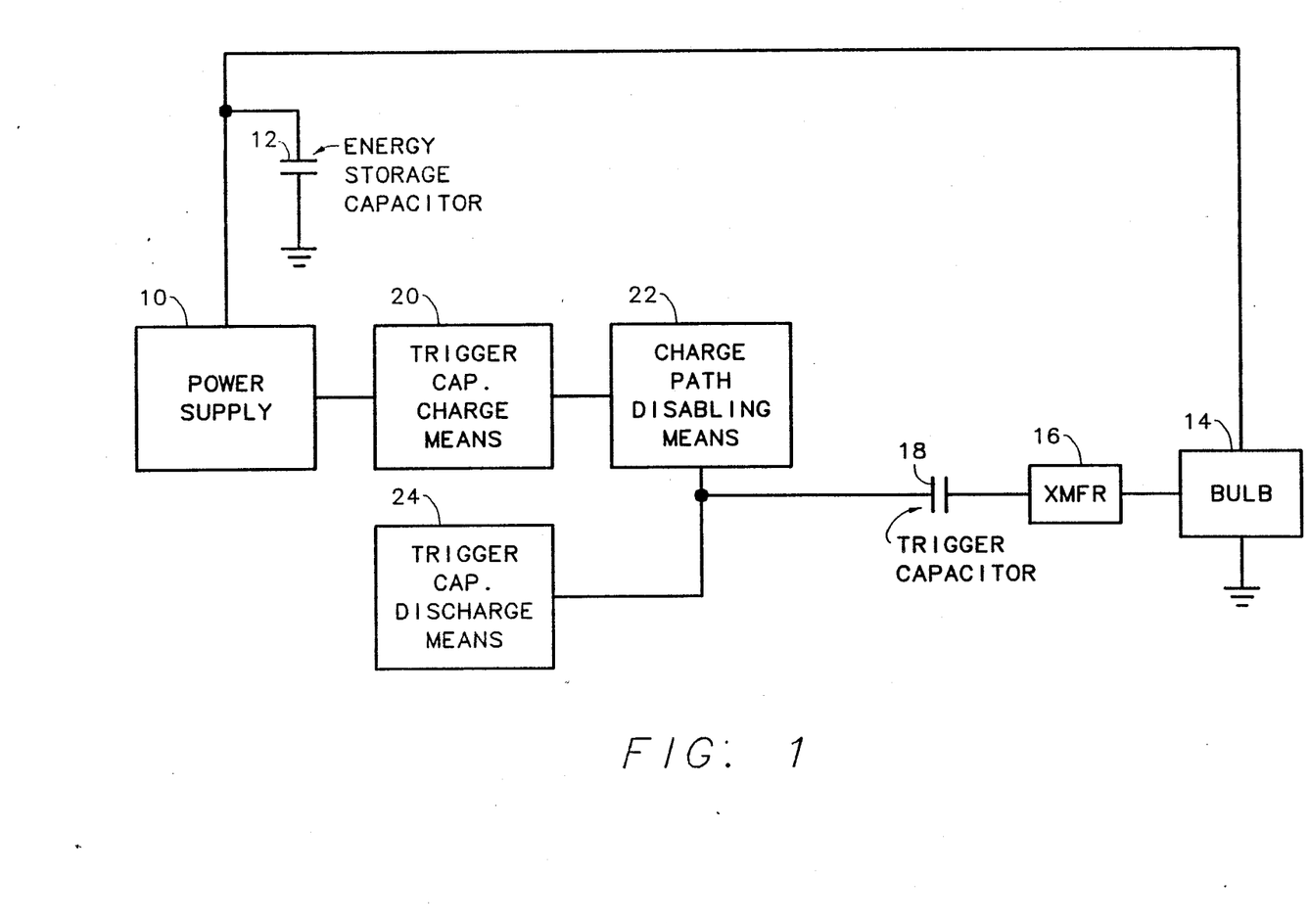
FIG. 1 is a generalized block diagram of the strobe trigger pulse generator of the present invention.

Referring now to FIG. 1, the most general form of the strobe trigger pulse generator of the present invention forms a part of a strobe power supply including a power supply element 10, an energy storage capacitor 12 and a gaseous discharge tube such as a xenon flash tube or bulb 14. A trigger pulse generating circuit is required to convert the comparatively low voltage power supply voltage to a four to six thousand volt trigger pulse capable of ionizing the gaseous interior of bulb 14. The trigger pulse generator circuit generates a trigger pulse which is stepped up by trigger pulse transformer 16 to the required high voltage level necessary to ionize bulb 14. Trigger capacitor 18 is charged over a comparatively long time interval and is periodically rapidly discharged to provide the pulsed input voltage for trigger transformer 16.

As illustrated in FIG. 1, trigger capacitor charge means 20 includes an input terminal coupled to power supply 10 and includes an output terminal coupled through charge path disabling means 22 to trigger capacitor 18 to thereby establish a current flow path between power supply 10 and trigger capacitor 18 to selectively direct a charging current to the trigger capacitor. Trigger capacitor discharge means 24 is also coupled to trigger capacitor 18 to periodically discharge the trigger capacitor through trigger pulse transformer 16 to generate a high voltage trigger pulse. Charge path disabling means 22 is coupled to the current flow path between power supply 10 and trigger capacitor 18 to control the charging current directed between trigger capacitor charge means 20 and trigger capacitor 18.

Figure 2:
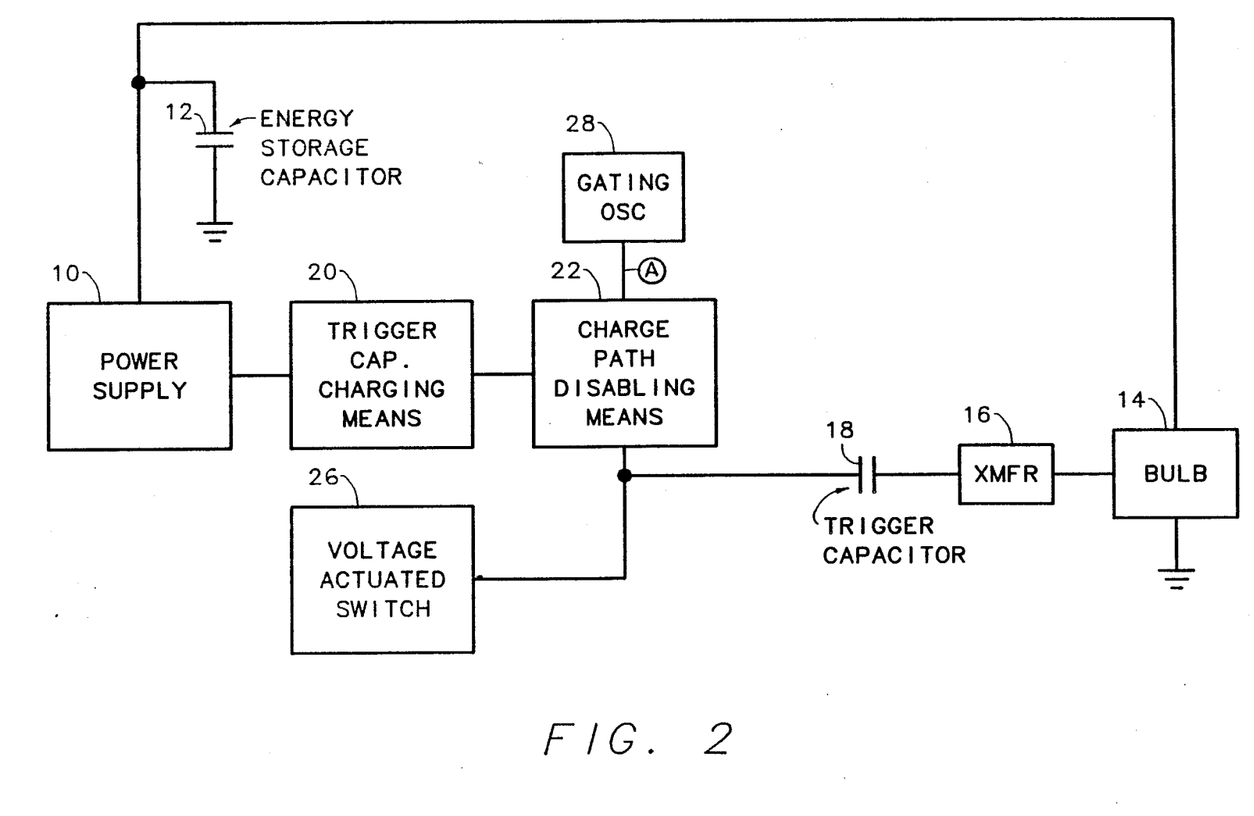
FIG. 2 represents a more specific block diagram embodiment of the strobe trigger pulse generator of the present invention.

Referring now to FIG. 2, a more specific embodiment of the strobe trigger pulse generator is depicted where the trigger capacitor discharge means 24 shown in FIG. 1 assumes the form of a voltage actuated switch 26 and where the operation of charge path disabling means 22 is controlled by gating oscillator 28. A specific embodiment of the FIG. 2 circuit is illustrated in the FIG. 3 electrical schematic diagram.

Figure 3:
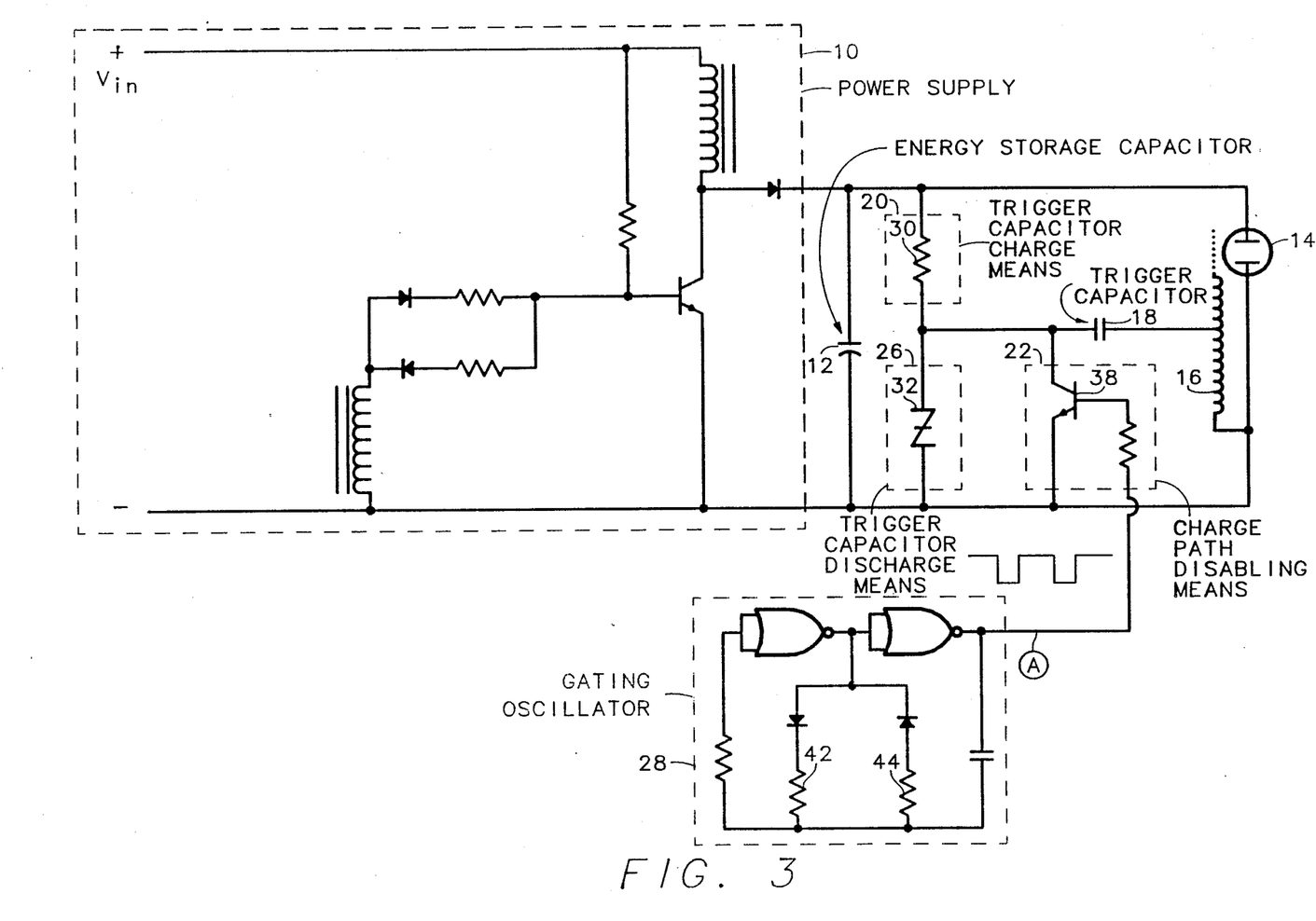
FIG. 3 represents an electrical schematic diagram of a specific preferred embodiment of the strobe trigger pulse generator of the present invention.

Referring now to FIG. 3, power supply 10 may take the form of any suitable low voltage DC to high voltage DC converter or an AC to high voltage DC converter circuit of a type well known to one of ordinary skill in the art. The specific circuit embodiment of power supply 10 illustrated in FIG. 3 represents a prior art DC to DC converter circuit of simple design including a single transistor blocking oscillator. The high voltage DC output of power supply 10 is coupled to charge energy storage capacitor 12.

In the FIG. 3 embodiment of the invention, trigger capacitor charge means 20 takes the form of a resistor 30 which controls and limits the flow of current between power supply 10 and trigger capacitor 18. A voltage actuated switch 26 in the form of a sidac 32 is coupled between resistor 30, trigger capacitor 18 and ground. The voltage to current transfer curve of a sidac semiconductor device is illustrated and explained in U.S. Pat. No. 4,755,723 to Sikora Which is hereby incorporated by reference. At a comparatively high input voltage level referred to as the breakover voltage or $V_{Bo}$, typically on the order of about 130 volts DC, the sidac rapidly switches from an open circuit condition to a short circuit. Beginning at that time, the charge stored in trigger capacitor 18 is rapidly discharged to ground through trigger transformer 16, causing trigger transformer 16 to generate an extremely high voltage trigger pulse for bulb 14. Once the level of trigger capacitor discharge current flowing through sidac 32 falls below the sidac holding current, the sidac switches back from a short circuit condition to an open circuit condition and the flow of current from power supply 10 through resistor 30 resumes and trigger capacitor 18 is rapidly recharged. After the voltage on trigger capacitor 18 once again reaches the sidac breakover voltage, the sidac switches into its short circuit condition and a second trigger pulse is generated.

Resistor 30, trigger capacitor 18 and sidac 32 form a relaxation oscillator, the frequency of which is controlled by the relative values of resistor 30 and trigger capacitor 18.

Figure 4A:
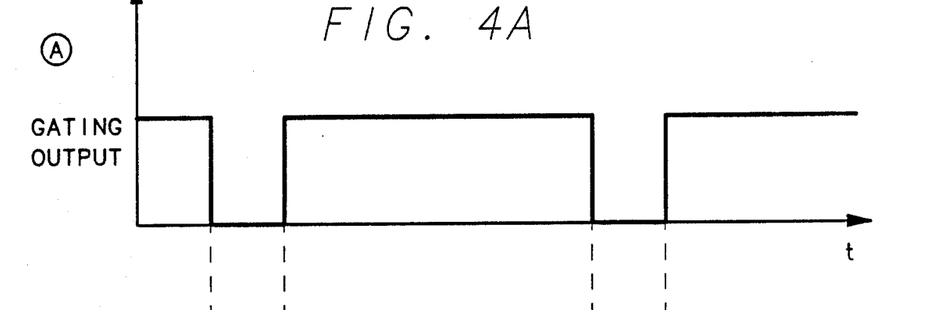
FIGS. 4A, 4B represents timing diagrams illustrating the operation of the FIG. 3 embodiment of the invention adjusted to generate paired trigger pulse trains.
Figure 4B:
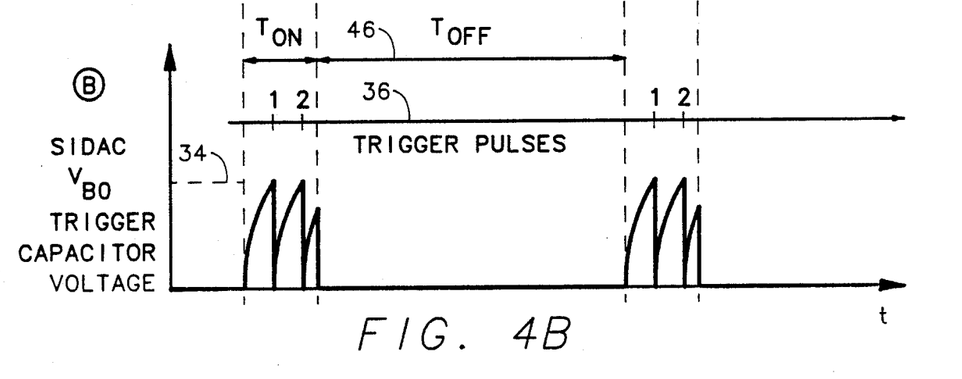

The operation of the sidac relaxation oscillator as described above is illustrated in timing diagram 4B and 5B. In FIG. 4B, the X axis represents the time axis while the Y axis represents the voltage on trigger capacitor 18. The sidac $V_{Bo}$ threshold level is represented by the dotted horizontal line designated by reference number 34. The horizontal line designated by reference number 36 marks the points at which trigger pulses are actually generated. By referring now to FIGS. 3 and 4, the manner in which the length of the trigger pulse train is controlled will now be described.

In FIG. 3, charge path disabling means 22 takes the form of a transistor switch 38, the operation of which is controlled by gating oscillator 28. The square wave output of acting oscillator 28 is illustrated in FIGS. 3 and 4 by the wave form designated "A." The "on time" versus "off time" or duty cycle of gating oscillator 28 is determined by the ratio of resistors 42 and 44. When the output of gating oscillator 28 is high, transistor 38 is turned on and shunts the trigger capacitor voltage to ground. When the output of gating oscillator 28 is low, transistor switch 38 is turned off and the relaxation oscillator as described above operates in a normal free running mode.

Referring now to FIGS. 4A and 4B, timing line 46 is divided by the series of vertical lines into time intervals designated "$T_{ON}$" and "$T_{OFF}$." The time interval "$T_{ON}$" identifies the portion of the gating oscillator duty cycle where shunt switch 38 is turned off permitting the relaxation oscillator to operator normally in the free running or "on" mode. The time interval designated "$T_{OFF}$" indicates the duty cycle time interval when shunt switch 38 is activated to disable the relaxation oscillator. As illustrated in FIG. 4, during the $T_{ON}$ time interval, a pulse train consisting of two trigger pulses is generated. Because the third partial relaxation oscillator cycle depicted in FIG. 4B fails to reach the sidac $V_{Bo}$ threshold level, the relaxation oscillator is disabled before the sidac is triggered to generate a third trigger pulse. During the $T_{OFF}$ time interval, the relaxation oscillator is disabled and the trigger pulse generator generates no trigger pulses.

Figure 5A:
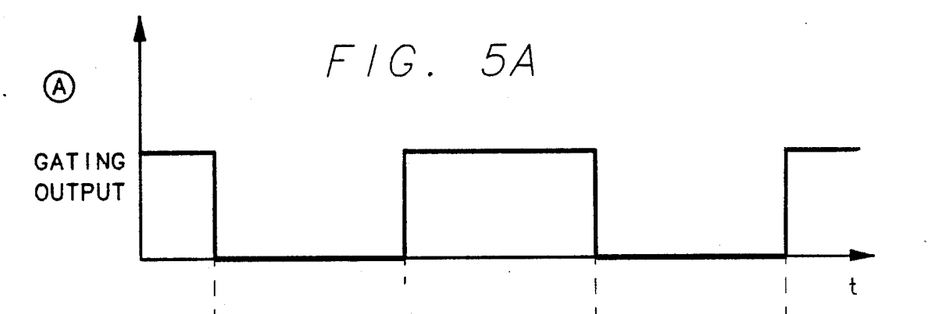
FIGS. 5A, 5B represents timing diagrams illustrating the operation of the FIG. 3 embodiment of the invention adjusted to generate a pulse train output consisting of six individual trigger pulses.
Figure 5B:
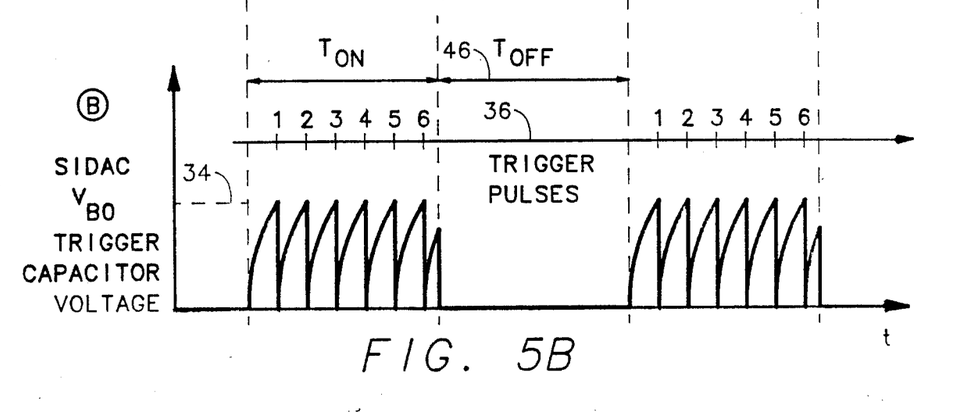

In the FIG. 5 timing diagram, the ratio between resistors 42 and 44 of gating oscillator 28 has been reconfigured to alter the gating oscillator duty cycle such that the $T_{ON}$ time interval is substantially longer than the FIG. 4 $T_{ON}$ time interval. Due to the longer $T_{ON}$ time interval depicted in FIG. 5, the trigger pulse generator of the present invention generates a pulse train consisting of six sequential trigger pulses followed by a shorter $T_{OFF}$ time interval.

Because the duty cycle as well as the frequency of gating oscillator 28 can be varied over a Wide range, the number of trigger pulses per pulse train can be varied from 0 to a potentially infinite number, and the time interval between sequential pulse trains can be varied from a comparatively short time to a comparatively long time. For a given fixed $T_{ON}$ time interval, the number of trigger pulses within a defined pulse train interval can be varied by modifying the relaxation oscillator RC time constant controlled by resistor 30 and trigger capacitor 18. By this means, the relaxation oscillator operating frequency can be either increased or decreased to control the number of trigger pulses generated within any given $T_{ON}$ time interval.

Figure 8:
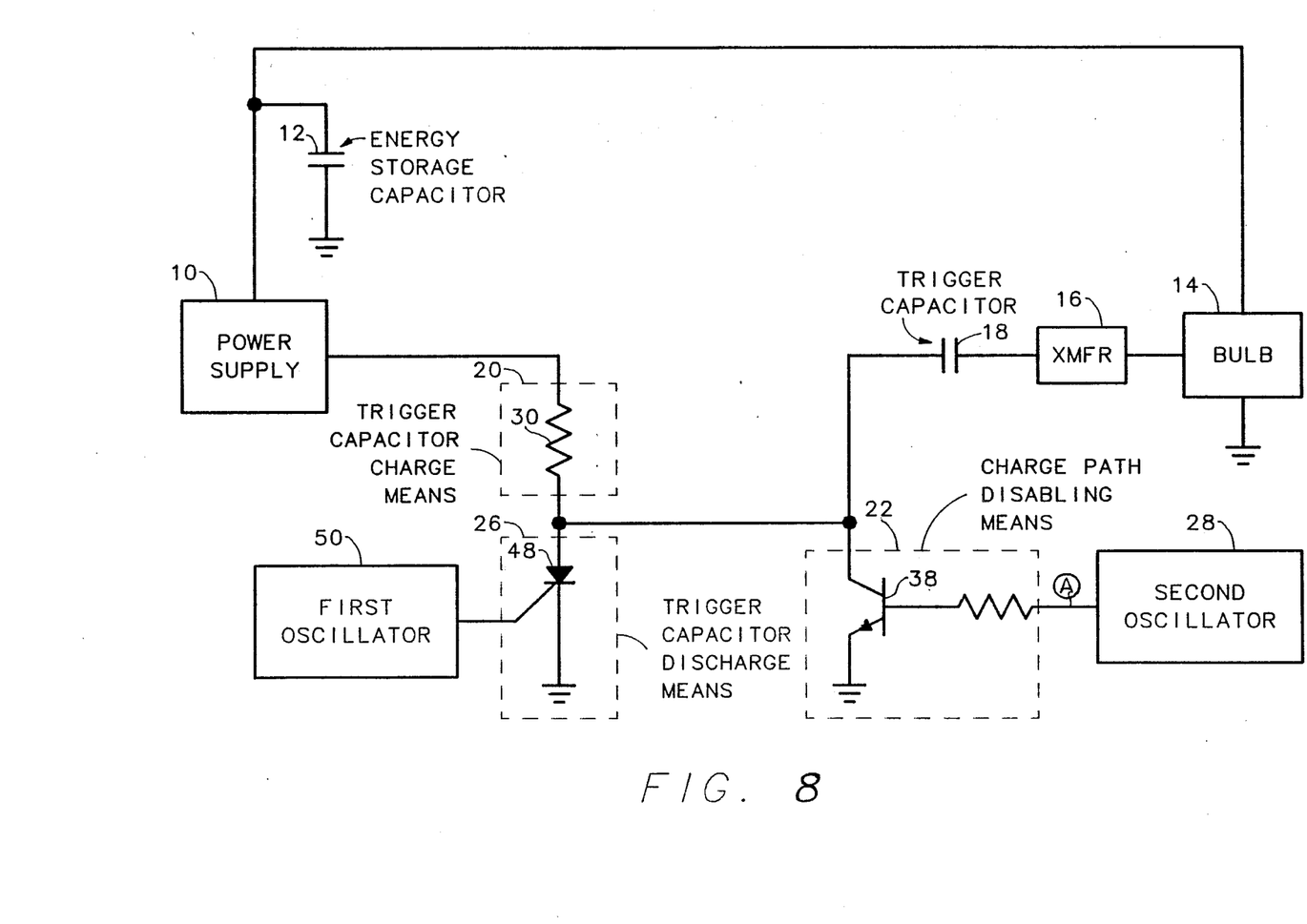
FIG. 8 represents another embodiment of the strobe trigger pulse generator of the present invention including first and second oscillators.

Referring now to FIG 8, another embodiment of the FIG. 1 invention is depicted. In this embodiment of the invention, trigger capacitor discharge means takes the form of a silicon controlled rectifier or SCR 48. The operation of SCR 48 is controlled by a first oscillator 50 which can take the form of a square wave generator, a sine wave generator, a relaxation oscillator or another equivalent type of oscillator which generates a periodic output waveform. The pulse repetition rate of the trigger pulses generated by the trigger pulse generator of the present invention is determined by the output waveform of first oscillator 50. In FIG. 8, the gating oscillator has been relabelled as second oscillator 28 which controls the duration of the trigger pulse train and the time interval between sequential trigger pulse trains as described above.

Figure 6A:
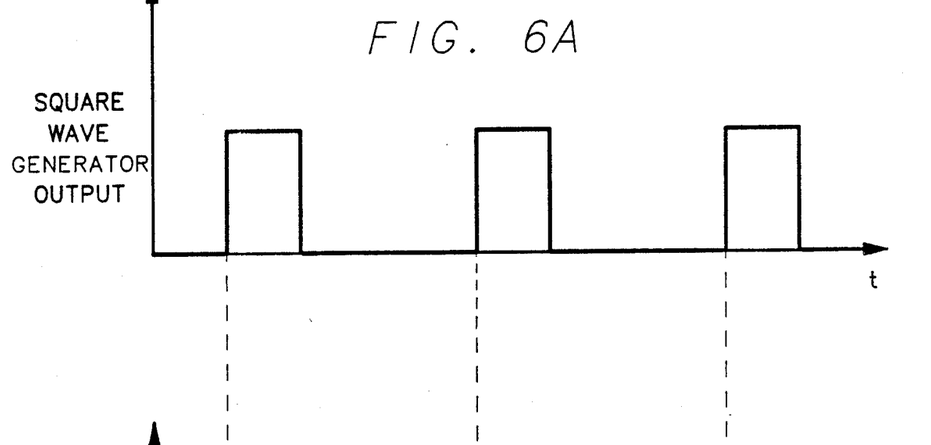
FIGS. 6A, 6B represents timing diagrams of a prior art trigger pulse generator of the type illustrated in FIG. 7.
Figure 6B:
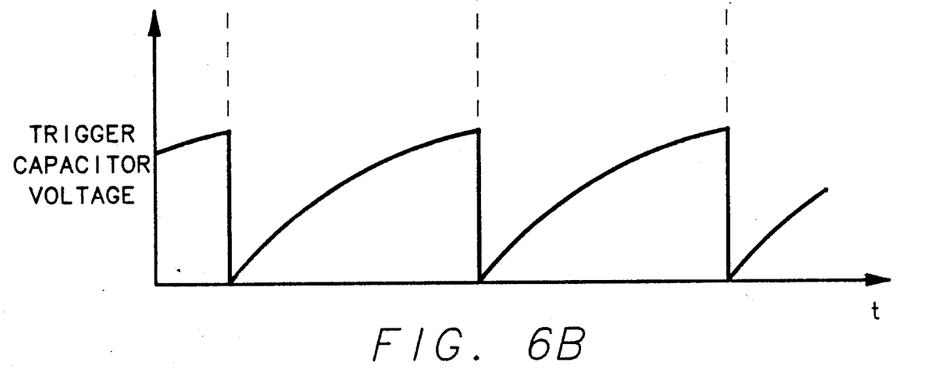
Figure 7:
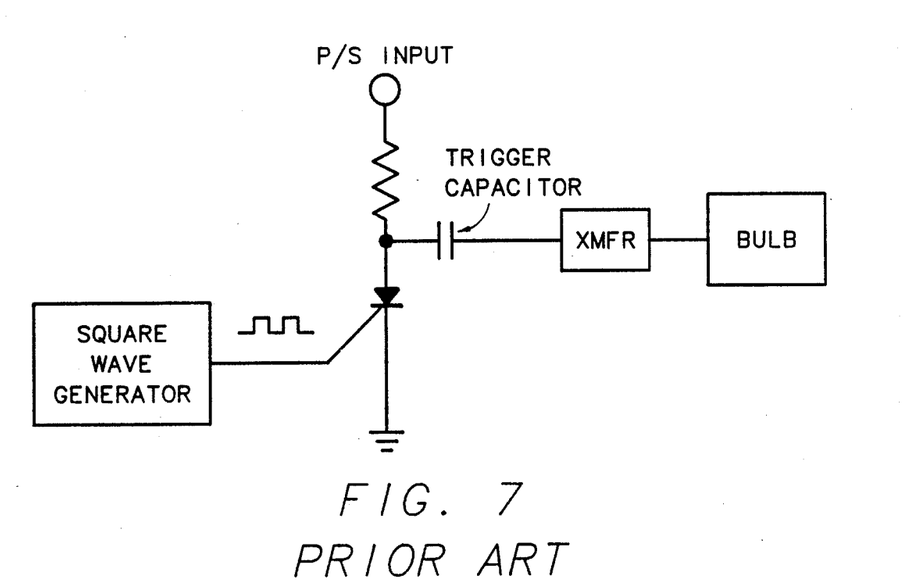
FIG. 7 illustrates a partial electric schematic diagram of a Prior art strobe trigger pulse generator.

The substantial differences between the strobe trigger pulse generator of the present invention and prior art trigger pulse generators can readily be appreciated by evaluating the circuitry and output waveforms of a typical prior art trigger pulse generator as illustrated in FIGS. 6 and 7. The FIG. 7 electrical schematic diagram illustrates that a square wave generator controls the operation of an SCR switch to generate a single trigger pulse in response to each output pulse from a square wave generator. FIG. 6A represents a timing diagram illustrating the output of the square wave generator while timing diagram 6B illustrates the trigger capacitor voltage. The dotted vertical lines interconnecting FIGS. 6A and 6B correspond to the generation of a single trigger pulse at the leading edge of each square wave output pulse. In the prior art Bosnak and Corthell patents described in the Background of the Invention, either paired SCR's or a triac is utilized to generate paired trigger pulses synchronized with both the leading and trailing edges of the square Wave output waveform illustrated in FIG. 6A. Such prior art trigger pulse generator circuits are therefore able to induce either a single flash or a double flash output in a strobe flash lamp. In the prior art double flash Bosnak and Corthell devices, the duty cycle of the square wave generator can be varied to vary the time interval between paired trigger pulse pairs or to vary the time interval between paired trigger output pulses When the structure and operation of the present invention is compared and contrasted with the prior art single flash and double flash strobe trigger pulse generator circuits described above, the substantial differences between the present invention and such prior art strobe trigger pulse generators are readily apparent. With the present invention, a trigger pulse train including one, two, three, four or any other number of pulses can be generated by merely varying the resistor 42/44 ratio of gating oscillator 28. By substituting a potentiometer for these two resistors in the FIG. 3 embodiment of the invention, the number of trigger pulses generated during any given pulse train can be varied in real time without modifying the structure of the trigger pulse generator.

Although in the FIG. 3 embodiment of the invention, charge path disabling means 22 is illustrated in the form of a shunt switch, that element of the invention could as well be placed in series with the current flow path between power supply 10 and trigger capacitor 18 and take the form of a semiconductor switch which transitions between open and closed circuit configurations to periodically disable the charge path between power supply 10 and trigger capacitor 18. The operating principle of that configuration of the invention would be essentially identical to that described above in connection with FIGS. 1 and 2 above.

In the FIG. 1 embodiment of the invention, charge path disabling means 22 could be either internally controlled or externally controlled by a microprocessor or other control device. The fact that gating oscillator 28 as illustrated in FIGS. 2 and 3 as being outboard of the charge path disabling means 22 is not intended to limit the structure of that element of the invention to such an outboard connection of a control device such as a gating oscillator.

FIG. 1 represents the more generic form of the invention where all appropriate operation and control elements of the charge path disabling means element of the invention are incorporated in a single circuit diagram block. The FIG. 2 and FIG. 3 embodiments of the invention showing an outboard gating oscillator merely represent a more limited and more specific embodiment of the more generalized FIG. 1 embodiment of the invention.

In the FIG. 2 embodiment of the invention, the trigger g capacitor discharge means 24 is illustrated as taking the form of a voltage actuated switch. Although in FIG. 3, voltage actuated switch 26 was illustrated as taking the form of a sidac 32, any other form of voltage actuated switch could readily be substituted in either the FIG. 2 or the FIG. 3 embodiments of the invention to serve the same or an equivalent function. A microprocessor controlled device could sense the voltage on trigger capacitor 18 and actuate a semiconductor switch or equivalent device to also serve as a voltage actuated trigger capacitor discharge means.

As shown in the FIG. 4 and FIG. 5 timing diagrams, the operating frequency of the voltage actuated switch 26 depicted in FIG. 2 or the first oscillator 50 depicted in FIG. 8 is substantially higher than the operating frequency of the gating oscillator illustrated in FIGS. 2 and 3 or the corresponding second oscillator illustrated in FIG. 8. This relationship merely reflects the conventional strobe light operating characteristic where one or more comparatively short interval flashes are separately by comparatively longer time intervals where no flashes occur.

It will be apparent to those skilled in the art that the strobe trigger pulse generator may be modified in numerous other ways and may assume many embodiments other than the preferred forms specifically set out and described above. Accordingly, it is intended by the appended claims to cover all such modifications of the invention Which fall Within the true spirit and scope of the invention.

I claim:

1. Apparatus for delivering current to an intermittently energized gaseous discharge tube comprising:
   a. a power supply for receiving an input voltage and for generating an output voltage;
   b. an energy storage capacitor coupled to be charged to a predetermined voltage by the power supply;
   c. a trigger pulse generator for intermittently energizing a trigger pulse transformer including
      i. a trigger capacitor having first and second leads, the first lead being coupled to the trigger pulse transformer;
      ii. trigger capacitor charging means having an input terminal coupled to receive the power supply output voltage and an output terminal coupled to the second lead of the trigger capacitor for establishing a current flow path between the power supply and the trigger capacitor to direct a charging current to the trigger capacitor;
      iii. trigger capacitor discharge means coupled to the second lead of the trigger capacitor for periodically discharging the trigger capacitor through the trigger pulse transformer to generate a high voltage trigger pulse; and
      iv. charge path disabling means continuously coupled to the current flow path between the power supply and the trigger capacitor to actively control the charging current directed to the trigger capacitor without removing the input voltage from the power supply to control the generation of trigger pulses independent of the energy storage capacitor voltage.

2. The apparatus of claim 1 wherein the trigger capacitor discharge means includes
   a. a semiconductor switch; and
   b. a first oscillator coupled to periodically activate the semiconductor switch.

3. The apparatus of claim 2 wherein the semiconductor switch includes a silicon control rectifier.

4. The apparatus of claim 1 wherein the trigger capacitor discharge means includes a voltage actuated switch coupled to the second lead of the trigger capacitor for periodically discharging the trigger capacitor through the trigger pulse transformer when the voltage across the trigger capacitor reaches a predetermined value.

5. The apparatus of claim 4 wherein the charge path disabling means includes means for periodically shunting the charge current away from the trigger capacitor to prevent the trigger capacitor charging means from increasing the voltage of the trigger capacitor to the predetermined value.

6. The apparatus of claim 5 wherein the shunting means further includes a gating oscillator and a switch for shunting the charge current away from the trigger capacitor.

7. The apparatus of claim 6 wherein the gating oscillator periodically opens and closes the shunt switch.

8. The apparatus of claim 7 wherein the gating oscillator generates an output waveform having a predetermined frequency and duty cycle.

9. The apparatus of claim 8 wherein the frequency and duty cycle of the gating oscillator can be independently varied.

10. The apparatus of claim 4 wherein the trigger capacitor charging means, the voltage actuated switch and the trigger capacitor form a relaxation oscillator.

11. The apparatus of claim 9 wherein the gating oscillator is a square wave generator.

12. The apparatus of claim 6 wherein the shunt switch includes a transistor switch.

13. The apparatus of claim 12 wherein the transistor switch is formed by a transistor having base, emitter and collector terminals, the collector terminal being coupled to the second terminal of the trigger capacitor and the base terminal being coupled to the gating oscillator.

14. The apparatus of claim 4 wherein the voltage actuated switch includes a sidac.

15. Apparatus for delivering current to an intermittently energized gaseous discharge tube comprising:
   a. a supply for receiving an input voltage and for generating an output voltage;
   b. an energy storage capacitor coupled to be charged to a predetermined voltage by the power supply;
   c. a trigger pulse generator for intermittently energizing a trigger pulse transformer including
      i. a trigger capacitor having first and second leads, the first lead being coupled to the trigger pulse transformer;
      ii. trigger capacitor charging means having an input terminal coupled to receive the power supply output voltage and an output terminal coupled to the second lead of the trigger capacitor for establishing a current flow path between the power supply and the trigger capacitor to direct a charging current to the trigger capacitor;
      iii. a first semiconductor switch coupled to the second lead of the trigger capacitor for periodically discharging the trigger capacitor through the trigger pulse transformer to generate a series of spaced apart high voltage trigger pulse trains, each pulse train including a controllable number of trigger pulses;
      iv. a first oscillator for generating an output waveform for periodically activating the first semiconductor switch and operating at a first frequency, the output waveform of the first oscillator controlling the number of trigger pulses in each pulse train;
      v. a second semiconductor switch continuously coupled to the current flow path between the power supply and the trigger capacitor to actively control the charging current directed to the trigger capacitor without removing the input voltage from the power supply to control the generation of trigger pulses independent of the energy storage capacitor voltage; and
      vi. a second oscillator for generating an output waveform for periodically activating the second semiconductor switch and operating at a second frequency lower than the first frequency, the wave form of the second oscillator controlling the time interval between each train of trigger pulses.

16. The apparatus of claim 15 wherein the operating frequency of the first oscillator controls the number of trigger pulses in each pulse train.

17. The apparatus of claim 15 wherein the second oscillator output waveform includes a predetermined frequency and duty cycle.

18. The apparatus of claim 17 wherein the frequency and duty cycle of the second oscillator output waveform can be independently varied.

19. The apparatus of claim 18 wherein variations of the duty cycle of the second oscillator output waveform controls the time interval between each train of trigger pulses.

20. The apparatus of claim 17 wherein the second semiconductor switch includes a voltage actuated switch.

21. The apparatus of claim 20 wherein the voltage actuated switch periodically discharges the trigger capacitor through the trigger pulse transformer when the voltage across the trigger capacitor reaches a predetermined value.

22. The apparatus of claim 21 wherein the first oscillator includes a relaxation oscillator.

23. The apparatus of claim 22 wherein the trigger capacitor charging means includes a resistor and wherein the resistor, the voltage actuated switch, and the trigger capacitor form the relaxation oscillator.

24. The apparatus of claim 23 wherein the operating frequency of the first oscillator is controlled by the relative values of the resistor and trigger capacitor which form the relaxation oscillator.

25. The apparatus of claim 22 wherein the second oscillator includes a square wave generator.

26. The apparatus of claim 25 wherein the second semiconductor switch includes a shunt switch for periodically shunting the charging current away from the trigger capacitor to prevent the trigger capacitor charging means from increasing the voltage of the trigger capacitor to the predetermined value.

27. The apparatus of claim 26 wherein the voltage actuated switch includes a sidac.

28. The apparatus of claim 16 wherein the second oscillator includes a square wave generator for generating an output waveform having a variable duty cycle, where variations in the duty cycle of the output waveform controls the time interval between each train of trigger pulses.

29. The apparatus of claim 28 wherein the operating frequency of the first oscillator is substantially higher than the operating frequency of the second oscillator.

30. Apparatus for delivering current to an intermittently energized gaseous discharge tube, comprising:
    a. a power supply for receiving an input voltage and for generating an output voltage;
    b. an energy storage capacitor coupled to be charged to a predetermined voltage by the power supply;
    c. a trigger pulse generator for intermittently energizing a trigger pulse transformer including
        i. a trigger capacitor having first and second leads, the first lead being coupled to the trigger pulse transformer;
        ii. trigger capacitor charging means having an input terminal coupled to receive the power supply output voltage and an output terminal coupled to the second lead of the trigger capacitor for establishing a current flow path between the power supply and the trigger capacitor to develop an increasing voltage across the first and second leads of the trigger capacitor;
        iii. a voltage actuated switch coupled to the second lead of the trigger capacitor and having open and closed states for periodically closing to discharge the trigger capacitor through the trigger pulse transformer when the voltage across the trigger capacitor reaches a predetermined value, the voltage actuated switch being reset to the open state following discharge of the trigger capacitor; and
        iv. means continuously coupled to the current flow path between the power supply and the trigger capacitor for periodically shunting the charge current away from the trigger capacitor to prevent the trigger capacitor charging means from increasing the voltage on the trigger capacitor to the predetermined value without removing the input voltage from the power supply to control the generation of the trigger pulses independent of the energy storage capacitor voltage.

31. The apparatus of claims 30 wherein the shunting means further includes a gating oscillator and a switch controlled by the gating oscillator for shunting the charge current away from the trigger capacitor.

32. The apparatus of claim 31 wherein the gating oscillator periodically opens and closes the shunt switch.

33. The apparatus of claim 32 wherein the gating oscillator generates an output wave form having a predetermined frequency and duty cycle.

34. The apparatus of claim 33 wherein the frequency and duty cycle of the gating oscillator can be varied.

35. The apparatus of claim 30 wherein the trigger capacitor charging means, the voltage actuated switch and the trigger capacitor form a relaxation oscillator.

36. The apparatus of claim 34 wherein the gating oscillator is a square wave generator.

37. The apparatus of claim 31 wherein the shunt switch includes a transistor switch.

38. The apparatus of claim 37 wherein the transistor switch is formed by a transistor having base, emitter and collector terminals, the collector terminal being coupled to the second terminal of the trigger capacitor and the base terminal being coupled to the gating oscillator.

39. The apparatus of claim 30 wherein the voltage actuated switch includes a sidac.

* * * * *